United States Patent [19]

Nobusawa

[11] 4,010,479

[45] Mar. 1, 1977

[54] FOCUSING APPARATUS FOR OPTICAL SYSTEMS

[75] Inventor: Tsukumo Nobusawa, Tokyo, Japan

[73] Assignee: Asahi Kogaku Kogyo Kabushiki Kaisha, Tokyo, Japan

[22] Filed: June 30, 1975

[21] Appl. No.: 591,464

[30] Foreign Application Priority Data

July 10, 1974  Japan ............................. 49-78212
Apr. 23, 1975  Japan ............................. 50-49268

[52] U.S. Cl. ............................... 354/25; 250/201; 250/204; 352/140; 356/4
[51] Int. Cl.² .......................................... G03B 7/08
[58] Field of Search ................... 354/25; 352/140; 250/201, 204; 356/1, 4

[56] References Cited

UNITED STATES PATENTS

| 3,631,785 | 1/1972 | Perlman et al. | 352/140 |
| 3,682,071 | 8/1972 | Hosoe | 354/25 |
| 3,829,866 | 8/1974 | Nobusawa | 354/25 |
| 3,849,643 | 11/1974 | Takeda | 354/25 |
| 3,856,392 | 12/1974 | Harrison | 352/140 |
| 3,856,407 | 12/1974 | Takeda et al. | 354/25 |
| 3,898,676 | 8/1975 | Hosoe et al. | 354/25 |

Primary Examiner—Russell E. Adams, Jr.
Attorney, Agent, or Firm—Christensen, O'Connor, Garrison & Havelka

[57] ABSTRACT

Focusing apparatus for use in optical systems, such as photographing cameras, is disclosed. The focusing apparatus of the invention comprises an electronic system for developing, through either a single or two separate channels, pulse trains, the number of pulses contained in the pulse trains being related to the brightness of the image forming light received by the optical system as focused on photoconductive elements. The electronic system further includes a comparing subsystem for comparing the number of pulses included in the two pulse trains and, in accordance therewith, generating an information output signal related to the focus state of the optical system. Alternatively, the output signal may control a drive system adapted to move the imaging lens portion of the optical system toward focus.

24 Claims, 12 Drawing Figures

FOCUSING APPARATUS FOR OPTICAL SYSTEMS

BACKGROUND OF THE INVENTION

This invention is directed to focusing apparatus and, more particularly, to focusing apparatus suitable for use with optical systems, such as photographing cameras.

In the past, focusing of optical systems, particularly those used in photographing cameras, have been accomplished by the operator adjusting the imaging lens of the optical system until the image to be viewed or photographed is focused to the best of his judgement, using his eye as the instrument for sensing a focusing condition. Since operator judgement is involved, obviously, experience is required, and a lack of experience often results in the creation of an unfocused or poorly focused image. In the case of a photographing camera, creation of an unfocused image results in the production of a picture that is out of focus.

While attempts have been made to provide automatic focusing devices for use in optical systems, such as photographing cameras, in general these attempts have been relatively unsuccessful and, in any case, unsuitable for widespread use.

Therefore, it is an object of this invention to provide a focusing apparatus for use in an optical system.

It is another object of this invention to provide a focusing apparatus suitable for use in a photographing camera.

It is a further object of this invention to provide a focusing apparatus suitable for providing an indication when an optical system is focused.

It is a still further object of this invention to provide an apparatus suitable for controlling the focusing of an imaging lens optical system.

SUMMARY OF THE INVENTION

In accordance with principles of this invention, a focusing apparatus suitable for use in an optical system to either provide an indication of the focus state of the optical system or provide for the automatic focusing of the optical system is provided. While the optical system may form part of a photographing camera, and the invention is generally described in this environment, more generally, the optical system can be any optical system that has the ability to be focused to create an image at a focal plane. Regardless of its environment of use, the focusing apparatus of the invention comprises an electronic system adapted to generate two separate pulse trains either simultaneously through two separate channels or sequentially through a single channel. The number of pulses in each pulse train (generated during equal, predetermined time periods) are related to the brightness of the image forming light passing through the optical system. The electronic system further includes a comparing means for comparing the number of pulses contained in each pulse train and, in accordance therewith, generating an output indicative of the focus state of the optical system.

In accordance with further principles of this invention, each channel of a two channel embodiment of the invention includes an oscillator whose frequency is controlled by a photoconductive element. The photoconductive elements are symmetrically disposed in the optical path of the optical system. In addition, each channel includes a pulse counter that counts the output generated by its related oscillator. The comparing means compares the outputs of the counters to provide an indication of the focus state of the optical system.

In accordance with alternate principles of this invention, a single channel embodiment of the invention includes a single oscillator whose frequency is controlled by a suitably positioned photoconductive element. In this embodiment pulse trains produced during succeeding time intervals are compared by the comparison means to determine which one of two sequential pulse trains includes a larger number of pulses and provide an indication of the focus state of the optical system.

In accordance with still further principles of this invention, the output information signal, related to the focus state of the optical system is connected to a drive mechanism connected to the imaging lens portion of the optical system. The drive mechanism moves the imaging lens of the optical system toward focus, in accordance with the nature of the output information signal.

It will be appreciated from the foregoing summary that the invention basically comprises a photoconductive system for sensing the focus or unfocus state of an optical system and, in accordance therewith, controlling the number of pulses developed in pulse trains within predetermined time periods. The pulse trains, which may be concurrently formed, or formed in succeeding time periods, are compared to provide a signal related to the focus state of the optical system. Alternatively, the information signal may be utilized to control a drive system adapted to move the optical system toward focus.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Prior to describing in detail the preferred embodiments of the invention, a brief description of the characteristics of photoconductive elements, such as cadmium sulfide (CdS) cells and their relationship to focusing in an optical system environment is set forth. It is known that a photoconductive element can be utilized as a photoelectric converter to develop an information signal about the focusing state of an optical system. In this regard, when light impinges on the light receiving surface of the photoconductive element, its internal resistance is increased over the value it would be if the light did not impinge on the light receiving surface. Thus, when a photoconductive element is disposed in the optical path of an imaging optical system, it can be used to develop an information signal related to impinging light. In an optical system impinging light is related to focus. Thus, the information signal related to the variation in the internal resistance of the photoconductive element is related to focus.

Figure 1:
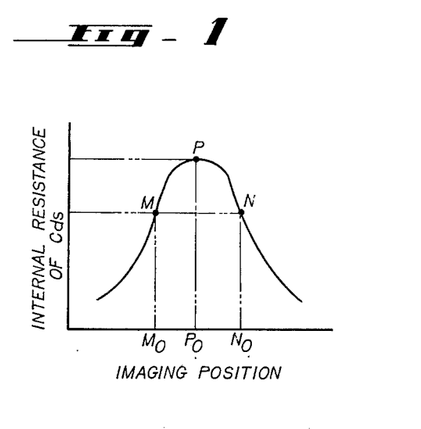
FIG. 1 is a graph illustrating how the internal resistance of a photoconductive element varies when an imaging lens imaging light on the photo conductive element moves between focus and unfocus positions, the graph also illustrates that two separate photoconductive elements located at symmetrical positions with respect to a focusing position will have identical internal resistances when the related optical system is focused.

The foregoing relation will be better understood by reference to FIG. 1, which is a graph displaying the characteristic curve of a photoconductive element wherein imaging position is illustrated on the abscissa and internal resistance is illustrated on the ordinate. It is apparent from FIG. 1 that, in the vicinity of a peak point (P), the internal resistance of the photoconductive element varies at a very small rate. This small variation makes it difficult to detect the peak point, P, using conventional analog circuit techniques. Because it is difficult to detect peak point P, it is even more difficult to obtain a highly accurate discriminating signal representing the focusing state of a related optical system. The present invention is directed to overcoming these difficulties and providing an output that accurately represents the focusing state of the optical system with which a photoconductive element having such a characteristic is associated.

More specifically, in contrast with conventional technique wherein attempts are made to utilize an analog system to sense the peak point of a photoconductive element, the first or two-channel embodiment of the present invention detects the focus adjustment position of the optical system by comparing two points, M and N, one disposed in the rising portion and the other disposed in the falling portion of the overall photoconductive element internal resistance characteristic curve. Preferably, M and N are located on the steep portions of this curve.

The first embodiment of the present invention includes and electronic system that generates two pulse trains in two separate channels. The frequencies of the pulse trains correspond to points M and N and, accordingly, to the intensity of the imaging light. It will be readily appreciated from viewing FIG. 1 that when the frequencies of the pulse trains become identical, the imaging lens is in a focus position. In this regard, when the pulses developed in each channel are counted and found to be identical, an information signal is produced to indicate that the optical system is focused.

It will be appreciated from the foregoing discussion that the invention utilizes the rapidly varying internal resistance portions of the characteristic curve of a photoconductive element to provide a focusing detector that is highly discriminatory. Not only is the accuracy of the information signal used to discriminate or determine the focusing state of the optical system improved, the invention also provides a high precision device that is relatively immune to such external influences as ambient temperature and fluctuations in power supply voltages.

Figure 2:
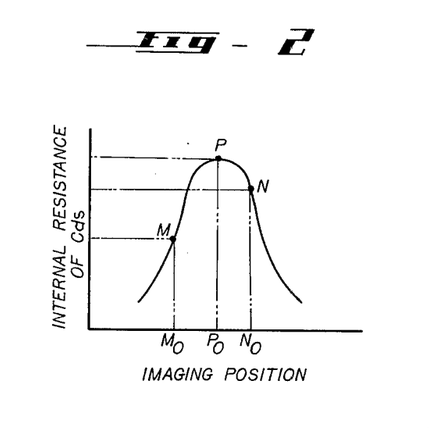
FIG. 2 is a graph generally similar to FIG. 1 and illustrates that the two symmetrically positioned photoconductive elements will have different internal resistances when the optical system is out of focus.

Turning now to a more detailed description of the first or two-channel embodiment of the invention; as noted above, when a photoconductive element is arranged on the abscissa axis of FIG. 1 at imaging point $P_0$, which corresponds to peak point P, and the imaging lens system is displaced, the inner resistance of the photoconductive element will vary as shown in FIG. 1. As discussed above, this photoconductive element will not provide an output that varies rapidly with a change in the focal point of the related optical system near the peak point. However, if, in accordance with the invention, a pair of photoconductive elements are disposed on the abscissa at points $M_0$ and $N_0$ (corresponding to points M and N), which points are symmetrical with respect to a vertical line passing through point P, the output of the photoconductive elements will vary rapidly with changes in focus. With such an arrangement, the displacement of the imaging point of the optical system from $P_0$ to $N_0$ causes the inner resistance of the first photoconductive element, disposed at $M_0$, to be reduced and the inner resistance of the second photoconductive element, disposed at $N_0$, to be increased. FIG. 2 illustrates this action. When the image point is displaced in the reverse direction, the inner resistances of the first and second photoconductive elements vary in the reverse manner. When the inner resistances of the first and second conductive elements are at an equal level, then the focusing point $P_0$ will lie exactly between $M_0$ and $N_0$. In this position, the optical system will be focused. It will be appreciated that the foregoing photoconductive element arrangement allows the focusing point to be detected under any conditions, irrespective of the intensity of the light incident onto the photoconductive elements, by merely comparing the internal resistance created at point $M_0$ and $N_0$ by incident light.

Figure 3:
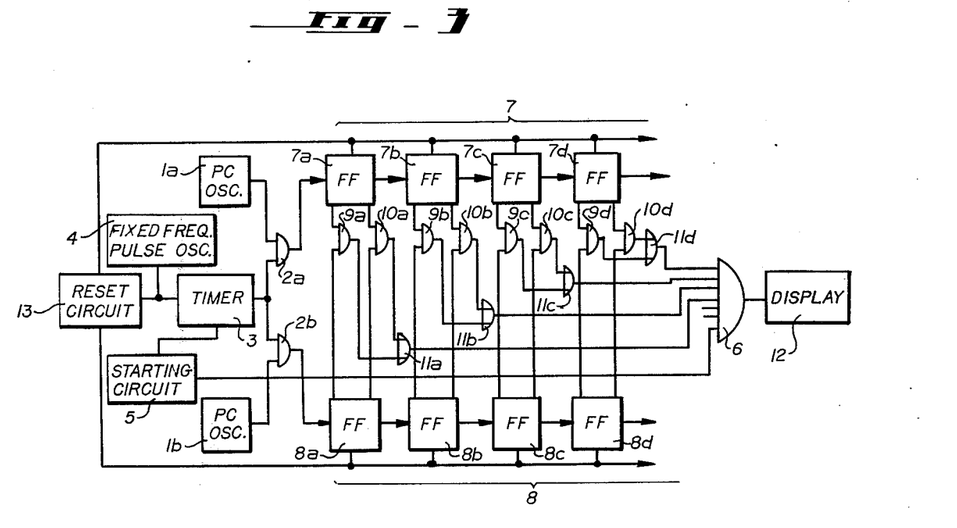
FIG. 3 is a block diagram of a two-channel embodiment of the present invention.

FIG. 3 is a block diagram illustrating an electronics system for: (a) generating two pulse trains having frequencies related to the internal resistance of two photoconductive elements located at points $M_0$ and $N_0$; (b) comparing the pulses occurring in the pulse trains over related time periods; and, (c) providing an output indicative of the focus state of the related optical system. The system illustrated in FIG. 3 comprises: first and second photoconductively controlled (PC) oscillators 1a and 1b; first and second two-input control AND gates 2a and 2b; a timer 3; a fixed frequency pulse (FFP) oscillator 4; a starting circuit 5; a multiple input AND gate 6; a first counter 7 comprised of a plurality of binary stages 7a, 7b, 7c, 7d, etc.; a second counter 8 comprised of a plurality of binary stages 8a, 8b, 8c, 8d, etc.; a plurality of comparison two-input AND gates designated 9a, 9b, 9c, 9d, etc. and 10a, 10b, 10c, 10d, etc.; a plurality of two-input OR gates 11a, 11b, 11c, 11d, etc; a display 12; and, a reset circuit 13.

Figure 4:
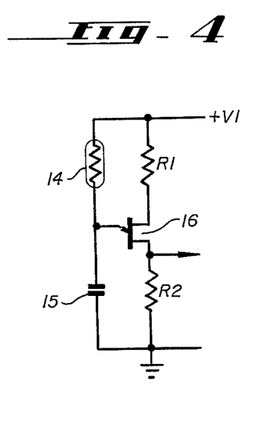
FIG. 4 is a schematic diagram of one form of an oscillator suitable for use in the embodiment of the invention illustrated in FIG. 3.
Figure 5:
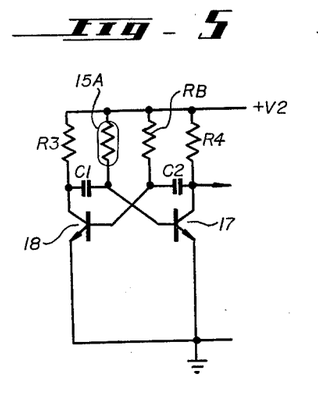
Fig. 5 is a schematic diagram of an alternate form of an oscillator suitable for use in the embodiment of the invention in FIG. 3.

As will be better understood from the following description of FIGS. 4 and 5, the first and second photoconductive elements are incorporated in the first and second PC oscillators 1a and 1b, respectively. The first and second PC oscillators 1a and 1b are so arranged that they develop pulse trains at frequencies corresponding to the internal resistances of the first and second photoconductive elements, respectively.

The output of the first PC oscillator 1a is connected to one input of the first control AND gate 2a and the output of the second oscillator 1b is connected to one input of the second control AND gate 2b. The second inputs of the first and second control AND gates 2a and 2b are connected to the output of the timer 3. As will be better understood from the following description, the timer 3 determines the counting time of the counters and, preferably, is a monostable multivibrator. The output of the FFP oscillator 4 is connected to the input of the timer 3 such that the timer 3 applies an enabling signal to the first and second control AND gates 2a and 2b for preselected periods of time when the FFP oscillator generates a pulse. The FFP oscillator may, for example, be a unijunction transistor (UJT) oscillator.

The starting circuit 5, which also may be a monostable multivibrator, has its input connected to the output of the timer 3 so as to receive a starting signal at the end of the timer period. The output of the starting circuit 5 is connected to a control input of the output AND gate 6.

The output of the first control AND gate 2a is connected to the input of the first stage 7a of the counter 7 and subsequent stages are connected serially so that the output of a preceding stage controls a subsequent stage in a conventional counting manner. Similarly, the output of the second control AND gate 2b is connected to the input of the first stage 8a of the second counter 8, and the other stages are serially connected thereto. Thus, as will be readily understood by those skilled in the art, the first and second counters are binary multistage counters, each stage of which may be formed by a trigger flipflop.

Both of the complementary outputs (e.g. Q and $\overline{Q}$) of each stage of the first and second counters 7 and 8 are compared in a comparator formed by the comparison AND gates 9a, 9b, 9c, 9d, etc. and 10a, 10b, 10c, 10d, etc. and the OR gates 11a, 11b, 11c, 11c, and 11d, etc. For ease of discussion, the set outputs of the stages are connected to the "9" gates and the reset outputs are connected to the "10" gates. Thus, the set outputs of the first stages 7a and 8a of the first and second counters 7 and 8 are connected to the inputs of gate 9a and, the reset outputs of these stages connected to the inputs of gate 10a. The outputs of these AND gates, 9a and 10a, in turn, are connected to the inputs of the first OR gate 11a. In a similar manner, the "9" and "10" AND gates are connected to the set and reset outputs of the remaining stages 7b, 7c, 7d, etc. and 8b, 8c, 8d, etc. of the first and second counters 7 and 8; and, the outputs of these AND gates are connected to the inputs of related OR gates.

The outputs of the plurality of OR gates 11a, 11b, 11c, 11d, etc. are connected on a one-to-one basis to inputs of the output AND gate 6.

It will be appreciated from the foregoing description, that two AND gates and an OR gate, in effect, form a comparator for each stage of the first and second counters 7 and 8. Each OR gate is in an output developing state (e.g. binary one) when each corresponding pair of counter elements are in similar set/reset states. When all of the OR gates are in output developing states, and the output AND gate 6 receives an enabling signal from the starting circuit 5, it developes an output (e.g. produces a binary one) that causes the display 12 to create a display. The display may be formed on a lamp or meter, for examples.

Because the first and second counters 7 and 8, are not always in identical states, they must be reset once each cycle of operation. The reset circuit 13 is connected to the output of the FFP oscillator 4 and performs this function. More specifically, the output of the reset circuit 13 is connected to the reset inputs of each stage of the first and second counters 7 and 8. While the reset circuit may take on a variety of forms, preferably, it is also a monostable multivibrator circuit.

It will be appreciated from the foreqoing description of the embodiment of the invention illustrated in FIG. 3 that all of the counter elements 7a, 7b, 7c, 7d, etc. and 8a, 8b, 8c, 8d, etc. are initially reset by the reset circuit 13 at the beginning of a cycle of operation. Since the reset circuit is controlled by the output of the FFP oscillator 4, it is controllable such that it only developes a reset signal when the FFP oscillator "instructs" it to do so. Thus, for example, if the reset circuit 13 is formed of a monostable multivibrator, it can be controlled such that it will only develop a reset pulse when it switches to its stable state and is placed in its unstable state upon receiving a signal from the FFP oscillator 4.

The same FFP signal that places the reset circuit in its unstable state also triggers the timer 3. When the timer 3 is triggered, it enables the first and second control gates 2a and 2b to pass pulses generated by the first and second PC oscillators 1a and 1b. Thus, for a preselected period of time, determined by the adjustment of the timer 3, pulses are applied to the first and second counters 7 and 8. It should be noted that the first and second PC oscillators are continuously oscillating devices. Thus they are oscillating at the time the timer enables the first and second control gates 2a and 2b and continue oscillating during the enablement time period, assuming their photoconductive elements are receiving light of a level adequate to cause oscillation. In any event, the number of output pulses flowing through the first and second AND gates 2a and 2b during the enablement duration time period, t, of the timer 3, are determined by the number pulses generated by the first and second oscillators 1a and 1b generated during that time period.

As will be better understood from the following description of FIGS. 4 and 5, and the previous description of the internal resistance of photoconductive elements, the first and second PC oscillators 1a and 1b develop pulses at a frequency rate related to the focusing position of the related optical system. If the optical system is in focus, they generate pulses at the same frequency rate. If the optical system is out of focus, they develop pulses at differing frequency rates.

Immediately at the end of the time period $t$, the output of the counter stages are compared by the previously described comparison mechanism. More specifically, in actuality, the comparison mechanism continuously compares the outputs of the various counter stages. However, the output AND gate 6 is only enabled by the starting circuit 5 at the termination of the time period $t$. Thus, an indication of comparison, or lack thereof, is only provided at the end of time period $t$. That is, at the termination of the time period $t$ the timer 3 causes the starting circuit 5 to apply an enablement signal to the output AND gate 6. If the counts in the two counters are equal at that period of time, the output AND gate 6 applies a binary one to the display 12. If the counts are unequal, the output AND gate 6 applies a binary zero to the display 12.

Turning now to an exemplary sequence of operation of the embodiment of the invention illustrated in FIG. 3, assume that the first and second control AND gates 2a and 2b each pass four pulses during the time period $t$. Under this set of circumstances, the counter elements 7a, 7b, and 7c of the first counter 7 will count and reverse their output states at the same time the first three stages 8a, 8b, and 8c of the second counter 8 count and reverse their output states. Thus, each pair of corresponding counter elements 7a and 8a, 7b and 8b, 7c and 8c, will have identical outputs so that the related OR gates 11a, 11b, and 11c forming a portion of the comparator will continuously be in binary one states. Since counter elements 7d and 8d of the first and second counters 7 and 8 will not take part in the counting the outputs of their related OR gate 11d will, similarly, be in a binary one state. Similarly, further higher order counting stages (not shown) will have their related OR gates in binary one states. In short, if the control AND gates 2a and 2b pass an equal number of pulses within the set time period $t$, then all of the OR gates 11a, 11b, 11c, 11d, etc. forming a portion of the comparator will be in binary one states. Thus, when the enable signal generated by the starting circuit 5 is applied to the output AND gate 6, it will apply a binary one to the display 12 i.e., the display 12 will be activated.

As will be appreciated from the foregoing description, when the count values of the counters 7 and 8 are identical, the display 12 provides an output indicating this state of affairs. Since the PC oscillators generate pulses at an equal rate only when their photoconductive elements receive equal amounts of light, this output is indicative of the fact that the related optical system is focused.

Since the starting circuit 5 is a monostable multivibrator, it only applies an enablement signal to the output AND gate 6 during some prescribed time period. Thus, after this time period has elapsed, the output AND gate 6 becomes disabled and the information display terminates.

The time constant of the reset circuit 13 is such that it returns to its stable state subsequent to the starting circuit 5 ending its enablement of the ouput AND gate 6. Thus, after the display is terminated, the first and second counter 7 and 8 are reset by the reset circuit 13. Upon receipt of an oscillation pulse from the FFP oscillator 4, the reset circuit 13 is returned to its unstable state, the timer is activated and the cycle repeats.

It will be appreciated from the foregoing description that the display 12 provides an intermittent, rather than a constant indication, as long as the related optical system is focused.

Turning now to a description of the operation of the first embodiment of the invention when the optical system is defocused. When the optical system is defocused, the first and second PC oscillators 1a and 1b oscillate at different frequencies. Therefore, during the predetermined time period $t$, different pulse counts are passed to the first and second counters 7 and 8 by the first and second count gates 2a and 2b. For example, within the predetermined time period $t$, the first PC oscillator 1a may produce four pulses and the second PC oscillator may produce three pulses. Thus, the first counter 7 will count four pulses while the second counter 8 counts only three pulses. In this case, one of the OR circuits (11c) produces a binary zero output when the output AND gate 6 is enabled by the starting circuit 5. Consequently, the display 12 receives a binary zero and is not activated. Thus, a nonfocus indication is provided.

Turning now to a description of the circuits illustrated in FIGS. 4–7, which are useful in the embodiment of the invention illustrated in FIG. 3. FIGS. 4 and 5 illustrate, respectively, oscillator circuits suitable for use in forming either the first or the second PC oscillator. FIG. 4 illustrates a unijunction transistor oscillator that includes a unijunction transistor 16 and two biasing resistors R1 and R2 connecting the bases of the unijunction transistor between a voltage source (+V1) and ground. Also connected between the voltage source +V1 and ground is a series combination comprising photoconductive (PC) element 14 and a capacitor 16. The junction between the PC element 14 and the capacitor 16 is conncted to the emitter of the unijunction transistor. The internal resistance of the PC element 14 controls the frequency of oscillation in a conventional manner. Thus, the frequency of the oscillation pulses produced at the first base of the unijunction transistor 16 corresponds to the internal resistance of the PC element 14.

FIG. 5 illustrates an astable multivibrator oscillator wherein a PC element 15A forms a timing resistor. More specifically, FIG. 5 illustrates an astable multivibrator comprising: first and second NPN transistors 17 and 18; the PC element 15A; two capacitors C1 and C2; two emitter biasing resistors R3 and R4; and a base biasing resistor RB. The emitter/collector terminals of the first and second NPN transistors are cnnected in series with their respective biasing resistors, R3 and R4, between a voltage sorce +V2 and ground. The bases of the first and second NPN transistors are cross coupled through C1 and C2, respectively, to the collectors of the oppostie transistor. The PC element 15A is cnnected between the base of the first NPN transistors 17 and +V2; and RB is connected between +V2 and the base of the second NPN transistor 18. It will be appreciated, that RB could also be a photoconductive element, if desired.

In the circuit arrangement illustrated in FIG. 5, the period during which the first NPN transistor 17 is held nonconducting (or the second NPN transistor 18 is held conducting) is determined by the internal resistance of the PC element 15A. Thus, the internal resistance of PC element 15A controls the pulse rate developed at the collector of the first NPN transistor 17.

As a further alternative to the oscillators illustrated in FIGS. 4 and 5, the first and second PC oscillators 1a and 1b could be formed by replacing the R resistor of a CR oscillator with a photoconductive element. In any event, it will be appreciated that any of these circuits can be utilized to form either oscillator, as desired.

Figure 6:
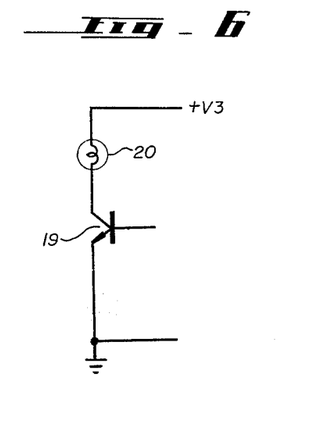
FIG. 6 is a schematic diagram of a display circuit suitable for use in the embodiment of the invention illustrated in FIG. 3.

FIG. 6 is a schematic diagram of one form of a display suitable for use in the embodiment of the invention illustrated in FIG. 3 and comprises: an indicator lamp 20; and, an NPN transistor 19. The indicator lamp 20 is connected in series with the emitter/collector terminals of the NPN transistor 19 between a voltage source +V3 and ground. The base of the NPN transistor is connected to receive the output of the output AND gate 6, illustrated in FIG. 3. The NPN transistor 19 is a switching transistor that switches the indicator 20 on and off in accordance with the state of the output of the output AND gate 6. As an alternative to the circuit illustrated in FIG. 3, the indicator lamp 20 could be replaced by a meter. As a further alternative, the indicator lamp could be replaced by a relay responsive to the output of the output AND gate 6 such that it stops the movement of an imaging lens drive system when it achieves a focus position.

Figure 7:
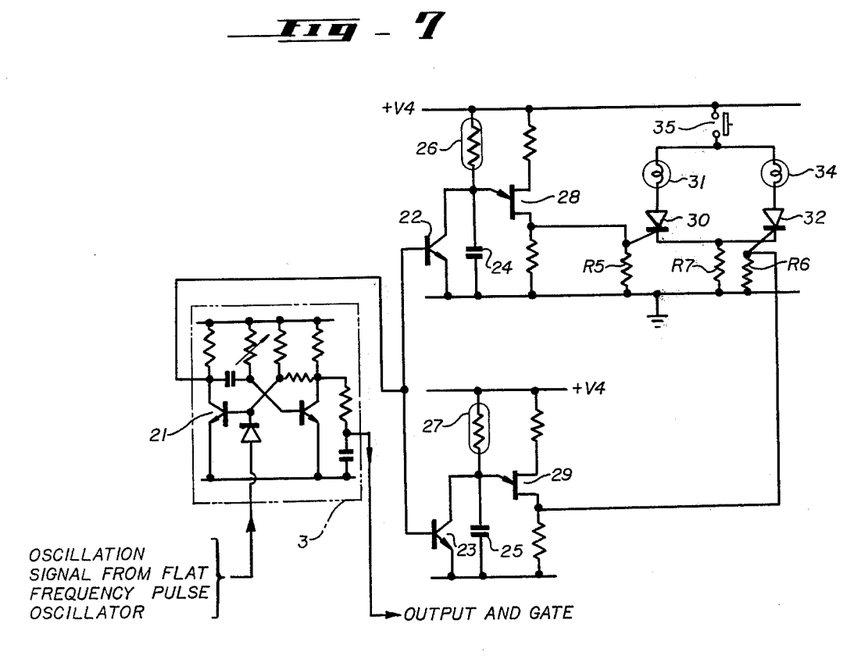
FIG. 7 is a schematic diagram of an alternate display circuit suitable for use in combination with the embodiment of the invention illustrated in FIG. 3 that provides an indication of the direction in which an imaging lens must be moved to achieve a focus state, as well as the fact that the optical system is out of focus.

FIG. 7 is a schematic diagram illustrating a portion of, and a modification to the embodiment of the invention illustrated in FIG. 3. The FIG. 7 modification is adapted to create a display that displays the direction that the optical system must be moved to achieve focus (or conversely the out-of-focus direction). It will be appreciated that such a modification is important if it is desired to achieve a focusing state in the shortest period of time.

FIG. 7 includes the timer 3, illustrated as being formed by a monostable multivibrator (which will not be described in detail here because such circuits are well known to those skilled in the art). The FIG. 7 display is controlled by the collector voltage formed on the monostable transistor 21, which is turned on when the timer 3 is placed in its stable state. More specifically, when the timer 3 is placed in its unstable state this transistor 21 is turned off and allows both of the PC oscillators 1a and 1b to oscillate. These oscillators are illustrated in FIG. 7 as unijunction transistor oscillators of the type illustrated in FIG. 4. Activation is accomplished through two control transistors 22 and 23, one associated with each PC oscillator. The transistors are connected such that when the timer 3 is in its unstable state they are turned off and the PC oscillators are allowed to oscillate. This action is accomplished by connecting the control transistors across the capacitors 24 and 25 of the unijunction oscillators such that they short the capacitors when they are turned on. When the timer is placed in its unstable state, transistors 22 and 23 are turned off whereby their associated capacitors 24 and 25 are charged at a rate related to the internal resistance of the photoconducting elements 26 and 27, which rate, in turn, is related to the intensity of the light impinging on the photo sensitive surface of the elements. Thus, the unijunction oscillators start to oscillate. As will be better understood from the foregoing description, one of the photoconductive elements, e.g. 26, is located at a position corresponding to position $M_0$ in FIG. 1 and the other photoconductive element, e.g. 27, is located at a position corresponding to position $N_0$.

When the optical system is in a defocus position, the internal resistance of one of the photoconductive elements e.g. 26, is smaller than the internal resistance of the other photoconductive element e.g. 27, as shown in FIG. 2. Under this set of conditions, the unijunction transistor oscillator associated with the photoconductive element having a lower internal resistance will start oscillating earlier than the other unijunction transistor oscillator. This effect controls the production of a directional indication as hereinafter described.

The indicator portion of FIG. 7 includes: a pair of indicator lamps 31 and 34; two silicon controlled rectifiers; 30 and 32; a switch 35; and, three resistors R5, R6 and R7.

R5 is connected between the first base of one of the unijunction transistors 28 and ground. R6 is connected between the first base of the other unijunction transistor 29 and ground. The first bases are also connected to the gates of the first and second silicon controlled rectifiers 30 and 32, respectively. The cathode/anode terminals of the silicon controlled rectifiers are each connected in series with one of the lamps 31 and 34, respectively. These series circuits are connected in parallel and the parallel connection is connected in series with the switch 35 and R7 between a voltage source designated +V4 and ground.

In operation, as discussed above, in the defocus position, one of the unijunction transistor oscillators will start oscillating earlier than the other. Accordingly, the silicon controlled rectifier related to that oscillator (e.g. 30 if transistor 28 starts first) will light its associated lamp 31. The lighting of this lamp, will prevent the initiation of oscillation of the other oscillator from turning on its associated lamp. This result occurs because R7 biases the other silicon controlled rectifier 32, such that it cannot be gated on, whereby its lamp will not glow.

It will be appreciated since the glow of the lamps can be recognized visually, which of the lamps is on at any particular point in time provides information as to the direction in which the optical system must be displaced in order to shift the imaging position from a defocus position to a focus position i.e., from $M_0$ to $P_0$ or from $N_0$ to $P_0$, for examples.

If desired, the display may be maintained constant, once initiated, by maintaining switch 35 closed. In this case, the lamp will be kept glowing during the entire focusing operation. However, such an approach involves the danger that focus could be bypassed. In addition, a continuously glowing lamp during the focusing operation is wasteful of power. Thus, this arrangement is not preferred. Rather, it is preferred that switch 35 be closed intermittently. If this course of action is followed, the lamps 31 and 34 will glow alternately, depending upon the actual focusing position of the related optical system. In this way, the position of the optical system can be discriminated easily and, when the imaging lens is displaced past the focusing position, ready detection is provided by closure of the switch 35. Consequently, the danger discussed above is eliminated.

If desired, the lamps 31 and 34 could be replaced by a relay drive mechanism adapted to move or displace the imaging lens of the optical toward focus. With this arrangement, the imaging lens, regardless of where its imaging position is located, may be controlled electrically and automatically moved towards a focus position i.e., the position whereat it forms an image at $P_0$. In such an arrangement, when the imaging lens is displaced to the position where it forms an image at position $P_0$, the output AND circuit 6, illustrated in FIG. 3, will produce an output in the manner previously described. This output may be connected to control switch 35 (which, in this case, would be a semi-conductor switch) such that it opens in response to the output AND gate 6 producing a binary one. Thus, the driver circuit is disabled when focus is achieved.

As described above, in the two-channel embodiment of the invention, the frequencies of the first and second pulse trains correspond to the intensity of imaging light on either side of a focusing position. The positions of the PC elements are chosen such that these frequencies become identical when the optical system is precisely focused. The two pulse trains are counted separately and the counts are compared with each other to determine the focusing state of the related optical system. When the optical system is out of focus (e.g. defocused), the number of pulses counted will vary in opposite directions i.e., one will be above the focus number of pulses and the other will be below. Thus, even a slight defocus condition will be determined with high accuracy. By way of example, assuming that within a preselected time period the first pulse train includes 1,001 pulses and the second pulse train includes 1,000 pulses. Even this one in 1,000 difference can be readily determined precisely to detect the defocusing state of the optical system. Thus, the first embodiment of the invention provides a system wherein, preferably, large numbers of pulses, in two pulse trains are counted separately and compared with each other to determine the focusing state of an optical system. With this arrangement the erroneous influence of early developing pulses, distorted by chattering, can be readily eliminated. This elimination serves to further improve the operational accuracy of this embodiment of the invention. Moreover, as noted above, variations in the intensity of the imaging light has very little influence on the accuracy of the invention. This benefit occurs because the numbers of pulses included in the two pulse trains vary with the variation in the intensity of the imaging light and the difference between the counting results is not influenced by variations in the intensity of the imaging light. That is, common variations vary both pulse trains in generally the same manner.

In addition, it will be appreciated from the foregoing description of a two-channel embodiment of the invention, that fluctuatons in ambient temperature and power voltage have very little influence on the operation of the system and, thus, its accuracy.

The second or single-channel embodiment of the invention, illustrated in FIG. 8 and hereinafter described, is directed to an apparatus for obtaining an information signal representing the focusing point $P_0$. In this embodiment, focusing state discriminating or detection accuracy is improved by the use of pulse signals whose frequency corresponds to the internal resistance of a photoconductive (PC) element. More specifically, the single-channel embodiment of the invention includes a single PC oscillator controlled by a single PC element disposed in the optical path of the related optical system. The PC oscillator is constructed such that it oscillates continuously for repetitive, preselected short periods of time. Each pulse train developed during the preselected periods of time is compared with the immediately preceding pulse train. In order to accomplish this comparison, there is provided a comparison system that includes: a memory for storing the immediately preceding pulse train; a memory for storing the pulse train currently being developed by the oscillator; and, a comparator for comparing the two pulse trains. The comparison system produces a first discrimination signal when the preceding pulse train includes a larger number of pulses than the next pulse train and a second discrimination signal when the next pulse train includes a larger number of pulses than the preceding pulse train. These two discrimination signals provide an indication defining which direction the imaging lens should be displaced to achieve focus. When no discrimination signal is developed, the pulses included in the two pulse trains are equal in number, indicating that the optical system is focused. If desired, and as illustrated, the first and second discrimination signals may be applied to a drive adapted to move an imaging lens such that its related optical system is displaced toward focus.

Figure 8:
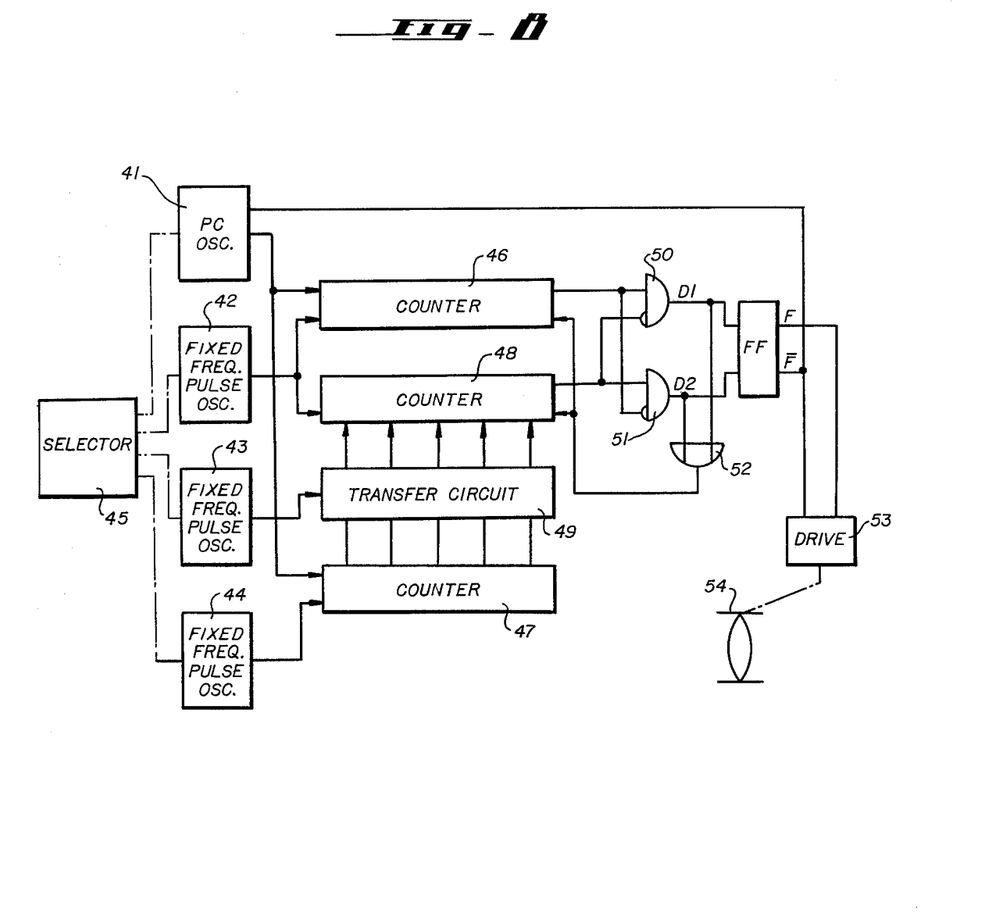
FIG. 8 is a block diagram of a single-channel embodiment of the invention.

As illustrated in FIG. 8, the single-channel embodiment of the invention comprises: a photoconductively (PC) controlled oscillator 41; three fixed frequency pulse (FFP) oscillators 42, 43 and 44; a multi-stage selector circuit 45; three multiple-stage counters 46, 47 and 48; a transfer circuit 49; two inhibit gates 50 and 51; an OR gate 52; a driver 53 connected to a related imaging lens 54; and, a flipflop FF.

The PC oscillator 41 and the three FFP oscillators 42, 43 and 44 are all controlled by the multi-stage selector 45 as illustrated by the dash-dot lines in FIG. 8. The multi-stage selector may be formed by a ring counter, for example. The various stages of such a ring counter will control these oscillators and other elements in the hereinafter described sequence.

Figure 10:
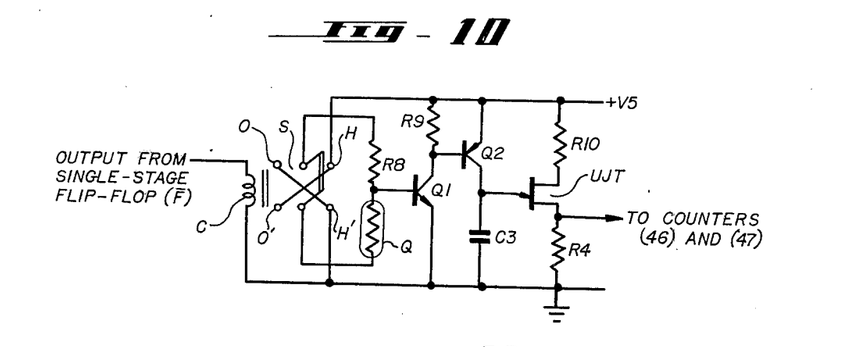
FIG. 10 is a schematic diagram of an oscillator suitable for use in the embodiment of the invention illustrated in FIG. 8.

FIG. 10 is a schematic diagram illustrating a PC oscillator suitable for use in the embodiment of the invention illustrated in FIG. 8 and comprises: a relay controlled double-pole, double-throw switch S; a PC element designated Q; four resistors designated R8, R9, R10 and R11; an NPN transistor designated Q1; a PNP transistor designated Q2; a capacitor designated C3; and a unijunction transistor designated UJT. The relay controlled double-pole, double-throw switch S includes a coil designated C and two sets of cross connected terminals, one set designated O,O' and the other set designated H,H'. The common terminals of S are connected together through R8 in series with Q. The junction between R8 and Q is connected to the base of Q1. The emitter of Q1 is connected to ground and the collector of Q1 is connected through R9 to a voltage source designated +V5. +V5 is also connected to H, and through the cross coupling wire to O'. H' is connected to ground and through the cross coupling wire to O.

The collector of Q1 is also connected to the base of Q2. The emitter of Q2 is connected to +V5 and the collector of Q2 is connected through C3 to ground. The collector of Q2 is also connected to the emitter of UJT. The second base of UJT is connected through R10 to +V5 and the first base of UJT is connected through R11 to ground. The output is taken at the first base of UJT. The $\overline{F}$ output of the flipflop illustrated in FIG. 8 and more fully hereinafter described is connected through C to ground.

The PC element Q is mounted in the light path of the optical system with which the present invention is being used. As will be readily understood from the foregoing description of the circuit illustrated in FIG. 10, the frequency of the pulses developed by the unijunction oscillator, formed by UJT, R10, R11 and C3, as controlled by Q2, varies in opposite directions depending upon the position of the selector switch S. For example, when the selector switch is closed at the H, H' terminals, the pulse frequency will vary in direct proportion to the variation in the internal resistance of Q. On the other hand, when S is closed at terminals O, O', the pulse frequency will vary in reverse proportion to the variation in the internal resistance of Q. Coil C controls the position of the selector switch. Normally, the selector switch is closed at terminals H, H' and is switched over to terminals O, O' when C is energized. C is energized in the manner hereinafter described.

The PC oscillator 41, under the control of the multistage selector 45, oscillates continuously for very short periods of time. The short periods of time are preselected time intervals that occur repetitively.

The pulses developed by the PC oscillator 41 within the predetermined time periods are simultaneously applied to the first and second counters 46 and 47. The third counter 48 is adapted to provide a memory or storage for the pulse count counted by the second counter 47. The count valve is transferred from the second counter 47 to the third counter 48 via the transfer circuit 49 subsequent to the termination of each predetermined time period during which the PC oscillator 41 generates pulses. Transfer occurs as a result of a pulse produced by the second FFP oscillator 43, upon receipt of a sequential control pulse produced by the multi-stage selector 45.

Figure 11:
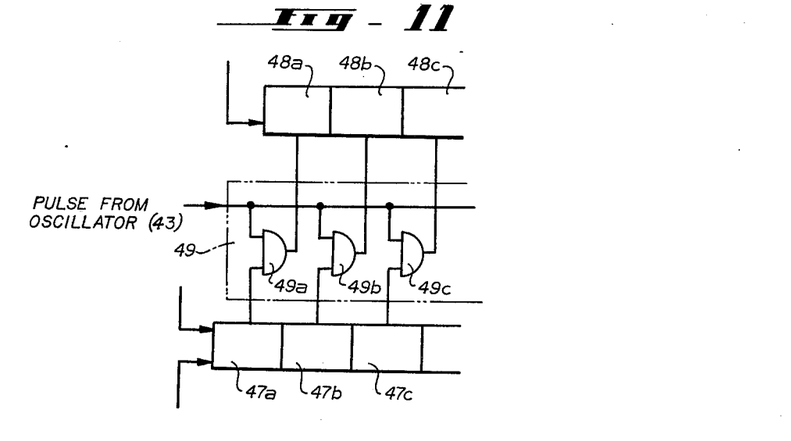
FIG. 11 is a block diagram of a portion of a transfer circuit suitable for use in the embodiment of the invention illustrated in FIG. 8; and, FIG. 12 is a block diagram of a modification of the embodiment of the invention illustrated in FIG. 8.

FIG. 11 is a block diagram illustrating an example of one form of a transfer circuit suitable for use in the embodiment of the invention illustrated in FIG. 8. The transfer circuit 49 illustrated in FIG. 11 comprises a plurality of two-input AND gates 49a, 49b, 49c, etc. One input of each AND gate is connected to the output of one stage e.g. 47a, 47b, 47c, of the second counter 47. The other inputs of all of the AND gates are connected to the output of the second FFP oscillator 43. The outputs of the AND gates 49a, 49b, 49c are connected to related stages e.g. 48a, 48b, and 48c of the third counter 48. In operation, when the AND gates are enabled by the second FFP oscillator 43 producing an enabling pulse, they transfer the pulse count from the second counter 47 to the third counter 48 in a stage-by-stage manner.

The first FFP oscillator 42 is adapted to apply additional pulses to the first and third pulse counters 48 to cause comparison of the count stored in these counters in the manner now to be described. Comparison is provided by the inhibit gates 50 and 51. The inhibit gates 50 and 51, are two-input gates each having an inhibiting and a noninhibiting input. These inputs are cross coupled to the outputs of the last stages of the first and second counters 46 and 48. Thus, the inhibit gates form a comparator circuit. As the pulse counts contained in these counters increase, as they receive additional pulses from the first FFP oscillator 42, the output of their last stages are continuously compared by the inhibit gates 50 and 51.

The outputs of the inhibit gates 50 and 51 form two discrimination signals. Which of the discrimination signals is actually produced depends upon which "last stage" produces a binary one first. The first discrimination signal, D1, is produced by the first inhibit gate 50 when the first counter 46 has a larger count value i.e., its last stage produces a binary one before the last stage of the third counter produces a binary one upon receipt of the above described additional pulses. The second discriminator signal, D2, is produced by the second inhibit gate 51 when the third counter has a larger count value. Both discrimination signals, D1 and D2, are applied to the reset inputs of the first and third counters 46 and 48 via the OR circuit 52.

The flipflop, FF, is connected to receive D1 and D2 at its inputs and generate complimentary output signals F and $\overline{F}$. The flipflop is operated such that upon receiving discrimination signal D1 F is in a binary one state and $\overline{F}$ is in a binary zero state. F and $\overline{F}$ are applied to the drive 53, which controls the movement of an imaging lens 54. The drive 53 is operative in response to $\overline{F}$ to move (advance) the optical system in one direction and in response to F to move (retreat) the optical system in the opposite direction. $\overline{F}$ is also applied to the coil C of switch S illustrated in FIG. 10 so that, when the imaging lens 54 is being retreated, the selector switch S is switched from terminals H, H' to terminals O, O'. As discussed above, this switching causes the oscillation frequency of the UJT oscillator to vary in reverse proportion to variations in the internal resistance of the photoconductive element Q.

The third FFP oscillator 44 is provided to control the resetting of the second counter 47 after its value has been transmitted via transfer circuit 49 to the third counter 48.

It is pointed out here that the inhibit gate 50 and 51 are provided to eliminate an unstable situation that could occur if the flipflop creating F and $\overline{F}$ were to receive signals directly from the first and second counters 46 and 48. That is, if a single stage flipflop was directly connected to the output of the counters, then the flipflop inputs would receive signals simultaneously under conditions when the counter values are identical to each other. This situation could cause the response characteristic of the flipflop to become unstable. This instability is eliminated by the inhibit gates 50 and 51.

Turning now to a more complete description of the operation of the embodiment of the invention illustrated in FIG. 8, after directing the optical system (e.g. camera) at an object, a power switch (not shown) is closed to start the operation of the multi-stage selector 45. The multi-stage selector 45 first enables PC oscillator 41 such that it oscillates for a short period of time. The pulse train developed during this short period of time is counted by the first and second counters 46 and 47. It is assumed for the purpose of the following discussion that the counters count a pulse quality count equivalent to the binary number 10110. After the first and second counters 46 and 47 have completed counting, the first FFP oscillator 42 starts oscillating in response to an enablement signal produced by the multi-stage selector circuit 45. The pulses generated by the first FFP oscillator 42 are counted by the first and third counters 46 and 48. It will be appreciated that at this time in the sequence of operation, the counter value of the third counter is 00000; hence, that counter only counts the pulses produced by the FFP oscillator 42 during the first sequence of operation. On the other hand, the additional pulses generated by the first FFP oscillator 42 are added to the 10110 count held in the first counter 46.

It will be appreciated that because the first counter starts with a higher count than the third counter, the last stage of the first counter develops a binary one output at an earlier point in time than does the last stage of the third counter 48. At the time when this binary one is developed, the first inhibit gate 50 is opened and a D1 discrimination signal is produced. D1 flows through OR gate 52 and resets the first and third counters 46 and 48. If desired, the first FFP oscillator may be simultaneously stopped. In any event, the state of FF remains such that the drive keeps displacing the imaging lens 54 in the advance direction.

The next action in the cycle of operation is the enablement of the second FFP oscillator 43 by the multi-stage selector. This enablement causes the production of a pulse which enables all of the AND gates of the transfer circuit 49 causing the count stored in the second counter 47 to be transferred to the third counter 48 in the manner previously described. Subsequent to transfer, the third FFP oscillator is enabled by the multi-stage selector 45 and produces a pulse that resets the second counter 47. At this point, the first cycle of operation has been completed and the PC oscillator 41 is again enabled and oscillates.

During the next cycle of operation, the pulses produced by the PC oscillator 41 are first counted by the first and second counters 46 and 47 in the same manner as previously described. Since the imaging lens has moved during the intervening period of time, the pulse count is different than the pulse count developed during the previous cycle of operation. Thereafter additional pulses are generated by the first FFP oscillator and counted by the first and third counters. As long as the first counter 46 has a higher "starting" count that the third counter 48, at the time the first FFP oscillator is enabled, a D1 signal is generated at the end of each cycle. Assuming that the internal resistance of the PC element Q increases as the imaging lens is advanced, the imaging lens 54 comes nearer to focus as it is advanced during these cycles of operation.

The coil C of the photoconductively controlled oscillator 41 illustrated in FIG. 10 is kept deenergized as long as the single-stage flipflop develops a one at its F output, said one being developed as long as the imaging lens is being advanced (as opposed to being retreated). Since C is deenergized during this period of time ($\bar{F}$ being a binary zero), the selector switch is closed at terminals H, H', whereby the oscillator frequency varies in direct proportion to the internal resistance of the PC element Q.

Figure 9:
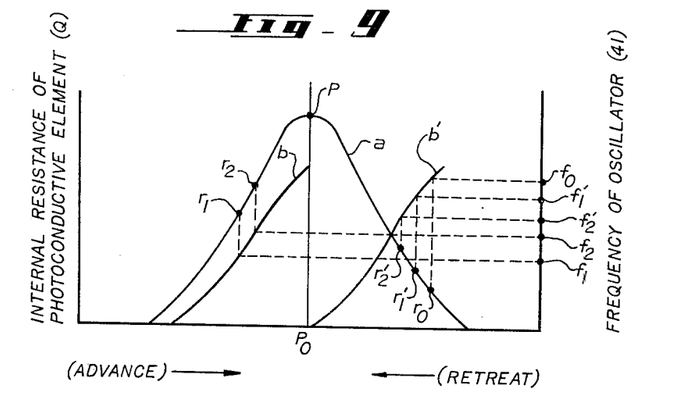
FIG. 9 is a graph utilized to explain the relationship between the pulse frequency produced by an oscillator and the internal resistance of a photoconductive element and is utilized to describe the embodiment of the invention illustrated in FIG. 8.

FIG. 9 is a graph representing the foregoing relationships. The displacement of the imaging lens 54 (or imaging position) is displayed on the abscissa and the internal resistance of the PC element Q, as well as the pulse frequency produced by the PC oscillator 41 is displayed on the ordinate. Advancement is from left-to-right and retreat is vice versa. The position, $P_0$, on the axis of the abscissa represents a position where the imaging lens is focused. In the defocusing positions to the left of $P_0$, the oscillation frequency of the oscillator 41 varies in direct proportion to the internal resistance of the PC element Q; whereas, in the defocusing positions to the right of $P_0$, the oscillation frequency of the oscillator 41 varies in reverse proportion to the internal resistance of the PC element Q. Curves $b$ and $b'$ represent such oscillation frequency characteristics.

Assuming for purposes of discussion that, immediately after starting the PC oscillator 41 for the first time, the PC element Q has an internal resistance of $r_1$; then, the internal resistance will have varied to $r_2$ when the PC oscillator 41 operates for the second time. The oscillation frequency increases from $f_1$ to $f_2$ during the intervening period of time because it varies in direct proportion to the variation in the internal resistance.

More specifically, as discussed in the foregoing description, the PC oscillator 41 first produces a pulse train for a short period of time at frequency $f_1$. Having counted this pulse train, the first and second counters store a related pulse count, e.g., 10110. Thereafter, the comparison and transfer actions, discussed above, occur. After termination of the first cycle of operation, the PC oscillator 41 operates for a second time and produces a second pulse train, now at $f_2$. This pulse train is counted by the first and second counters 46 and 47, as discussed. The counter values stored in the first and third counters 46 and 48 are then compared as additional pulses are produced by the first FFP oscillator 42. Since $f_2$ is larger than $f_1$, the pulse count stored in the first counter 46 is larger than the pulse count stored in the third counter 48. Thus, the output of the last stage of the first counter 46 achieves a binary one state first and a D1 discrimination signal is developed. This discrimination signal causes the optical signal to continue advancing toward the focusing position and resets the first and third counters 46 and 48. Thereafter, the second counter 47 has its value transferred to the third counter 48 and is reset.

The above-described operational cycle is repeated until the imaging lens 54 passes through $P_0$. After the imaging lens 54 passes $P_0$, the internal resistance of the PC element Q reduces to a point such that the pulse count transferred to the third counter 48 is larger than the new pulse count counted by the first counter 46. When this occurs, the additional pulses produced by the first FFP oscillator 42 cause the last stage of the third counter 48 to achieve a binary one state earlier than the last stage of the first counter 46. Thus a D2 discrimination signal is produced. D2 causes the F output of the single-stage flip-flop FF to shift to a binary zero state and the $\bar{F}$ output to shift to a binary one state, whereby the drive 53 reverses the direction of movement of the imaging lens 54. Thereafter, the imaging lens 54 will again pass through $P_0$. When it enters the defocusing region on the left side of $P_0$, it is controlled as mentioned previously to be displaced rightwards toward $P_0$. After a slight amount of hunting in this manner, the imaging lens stops at $P_0$, whereat it is focused.

Now the operation of FIG. 8 will be described under conditions where the PC element Q starts with an internal resistance $r'_1$ indicating that the optical system is defocused to the right of $P_0$. Under this circumstance, the PC oscillator 41 produces pulses at a first frequency $f'_1$ determined by internal resistance $r'_1$ and these pulses are counted by the first and second counters 46 and 47. The pulse count counted by the first counter 46 is compared with the pulse count stored in the third counter 48, in the same manner as previously described. Since at this point the content of the third counter 48 is zero, a D1 discrimination signal is produced causing the imaging lens to move to the right and the internal resistance of the PC element Q to reduce to $r_0$. However, the pulses counted by the first and second counters 46 and 47 during the second cycle are lower than the pulse count created during the first cycle. Thus, when contents of the first and third counters 46 and 48 are thereafter compared, the content of the third counter 48 (since it is the counter value of the pulse train which is dependent on the internal resistance $r'_1$ of the PC element Q) is larger than the content of the first counter 46. Accordingly, a D2 discriminatio signal is produced causing the $\bar{F}$ output of the single-stageflipflop to achieve a binary one state and, in turn, cause the optical system to move to the right. Moreover, in response to the one state of the $\bar{F}$ output of the signal-stage flipflop, coil C of the PC oscillator 41 is energized to switch the selector switch S to terminals 0, 0′. Thereafter, the oscillation frequency of the PC oscillator 41 is varied in reverse proportion to the internal resistance of the PC element Q. Thus, as the internal resistance of the PC element Q is varied in the order of $r_0, r'_1, r_2, \ldots$ ($r_0 < r'_1 < r_2 < \ldots$), the oscillation frequency of the PC Oscillator 41 varies in the order of $f_0, f'_1, f'_2, \ldots$ ($f_0 < f'_1 < f'_2 < \ldots$). Accordingly, once the imaging lens 54 has been moved to the left, the oscillation frequency of the PC oscillator 41 is reduced each subsequenct cycle of operation. However, until $P_0$ is reached, each time a comparison occurs, the pulse count stored in the third counter 48 is greater than the pulse count counted by the first counter 46. Even though the discriminatio signal is developed intermittently, the $\bar{F}$ output of the single-stage flipflop remains in a binary one state to cause the imaging lens system 54 to retreat. Once the imaging lens 54 passes through $P_0$, the internal resistance of the PC element Q reduces to the point where the frequency of the instant pulse train becomes larger than the frequency of the previous pulse train. Thus, the pulse count counted by the first counter 46 becomes larger than the pulse count stored in the third counter 48. When this occurs a D1 discrimination signal is developed causing the imaging lens 54 to move to the right, as described above.

As noted above, the imaging lens may pass through $P_0$. Once it has done so, it is controlled so as to move in the opposite direction until it finally stops at $P_0$.

Figure 12:
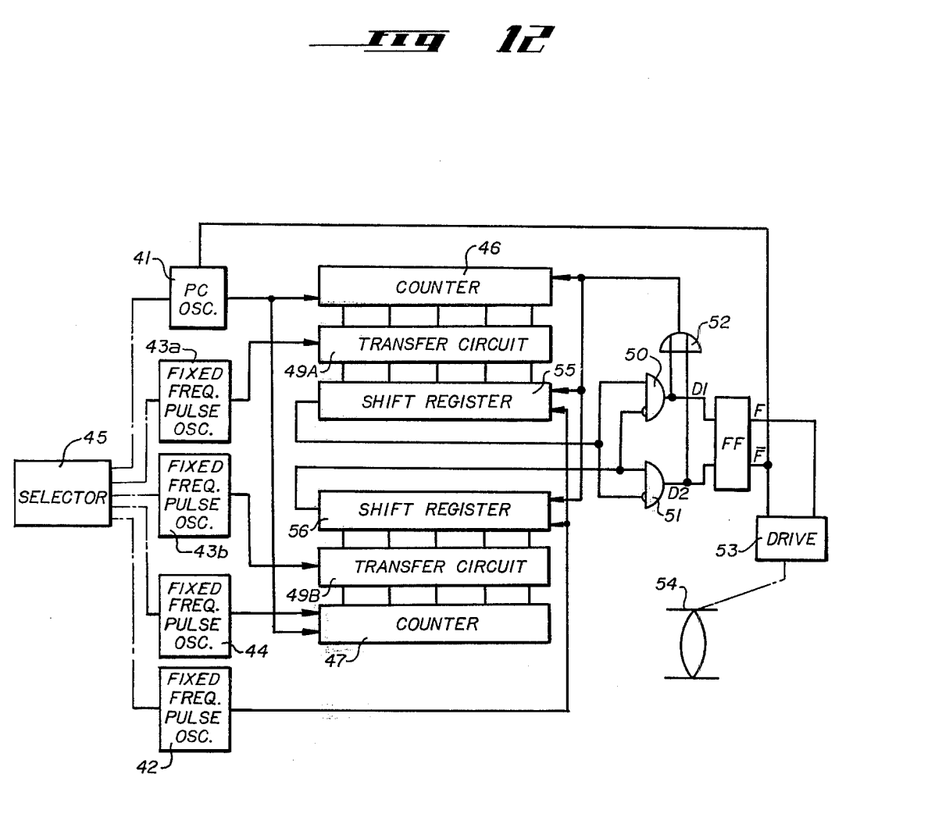

FIG. 12 is a block diagram illustrating a modification of the single-channel embodiment of the invention illustrated in FIG. 8. Since many of the subsystems are identical only different subsystems and their operation will be discussed in detail. In this regard, the second FFP oscillator 43 of FIG. 8 is replaced by two FFP oscillators 43a and 43b. In addition, two transfer circuits 49a and 49b, rather than a single transfer circuit 49 are included. Finally, two shift registers 55 and 56 are added.

In the embodiment of the invention illustrated in FIG. 12, the pulse train produced by the PC oscillator 41 is counted by the first and second binary counters 46 and 47, generally as described above. After the pulse train has terminated, in response to a pulse produced by one of the two new FFP oscillators 43a causes the first transfer circuit 49a to transfer the counter value from the first counter 46 into the first shift register 55. Thereafter, the first FFP oscillator 42 applies additional pulses to the first and second shift registers 55 and 56. At this time, the content of the second shift register 56 is zero. Common shift register stages produce outputs, which are applied to the comparator formed of inhibit gate 50 and 51. Since the content of the second shift register 56 is zero, the common stage of the first shift register 55 first achieves a binary one state causing D1 discrimination signal to be produced. This signal, as previously described, causes the imaging lens 54 to advance i.e., move toward the left as viewed in FIG. 9. Immediately after having been developed the D1 discrimination signal resets the first counter 46, as well as both shift registers 55 and 56. Subsequently, the other of the two new FFP oscillators 43b produces a pulse that causes the second transfer circuit 49b to transfer the output of the second counter 47 into the second shift register 56. Thereafter, the second counter 47 is reset by the output of the third FFP oscillator 44. At this time, the first cycle of operation has been completed. Thereafter, the PC oscillator 41 produces a second pulse train which is counted by the first and second counters 46 and 47.

After the second pulse train has been counted, FFP oscillator 43a transfers the count from the first counter 46 into the first shift register 55, as described above. Then, the second FFP oscillator applies pulses to the first and second shift registers causing them to shift their pulse counts in a conventional manner. As the pulse counts are shifted, the output of the common stage is compared in the comparator formed by the first and second inhibit gates 50 and 51. If it is assumed that the optical system 54 is in the defocusing region on the left of $P_0$, as viewed in FIG. 9, then the first shift register 55 will have a large count content than the second shift register 56, whereby a D1 discrimination signal will again be produced. The D1 discrimination signal will cause the imaging lens to continue moving toward the right. On the contrary, if the imaging lens 54 is in the defocusing position to the right of $P_0$, then the second shift register 56 will have a larger count content than the first shift register 55. In this case, a D2 discrimination signal will be produced and cause the imaging lens to move to the left. As with the structure illustrated in FIG. 8, in the embodiment of the invention illustrated in FIG. 12, this operational sequence is repeated until the imaging lens stops at the focusing point $P_0$.

It will be appreciated from the foregoing description that the signle-channel embodiments of the invention illustrated in FIGS. 8 and 12 employ PC oscillators that repeatedly develop pulse trains at preselected constant intervals and that the oscillation frequency is determined by the internal resistance of a PC element arranged in the light path of an optical system. The number of pulses produced in a first train is compared with the number of pulses produced in a subsequent pulse train so as to obtain, depending upon the comparison, an information signal related to the distance and direction in which the optical system must be displaced to obtain focus. These embodiments of the invention use only a single photoconductive element, as opposed to a pair of photoconductive elements. Thus, these embodiments eliminate a possible danger caused by a difference in characteristics which can occur if two photoconductive elements are employed. Moreover, the space required for mounting the sensor structure (e.g. photoconductive element) as well as the total number of parts is less than those required in the FIG. 3 embodiment of the invention.

It will be appreciated that, with respect to all embodiments of the invention, the optical sytem can be focused automatically by use of pulse signals and, even when an object to be photographed is displaced after a first focus adjustment, the optical system will automatically follow the displacement of the object to maintain it in focus. Moreover, with the invention, it is possible to minimize the reduction in focusing accuracy which otherwise might be caused by fluctuations in power voltage and ambient temperature. Furthermore, an automatic focusing operation controlled by pulse signals is highly responsive even to a slight variation in the internal resistance of a photoconductive element and, thus, is effective to improve operational accuracy. If desired, the selector switch S illustrated in FIG. 10 may be constructed as a contactless switching circuit.

The embodiment of the invention in which an exclusive property or privilege is claimed are defined as follows:

1. Focusing apparatus for use in an optical system comprising:

at least one photoconductive elememt mounted such that an imaging lens forming part of an optical system directs light onto its photosensitive surface and having an internal resistance that varies in accordance with the intensity of light impinging onto its photo sensitive surface;

pulse generating means for generating pulse trains, said pulse generating means connected to said at least one photoconductive element such that the frequency of the pulses generated by said pulse generating means is related to the internal resistance of said at least one photoconductive element;

counting means connected to said pulse generating means for counting two pulse trains generated by said pulse generating means during a predetermined time period;

comparing means connected to said counting means for comparing said two pulse trains counted by said counting means; and, output means connected to said comparing means for providing one form of output when said comparing means determines that said two pulse trains include an equal number of pulses and a different form of output when said comparing means determines that said two pulse trains include different numbers of pulses, said equality of pulses occurring when said optical system is in focus.

2. The focusing apparatus claimed in claim 1 wherein said output means includes a display.

3. The focusing apparatus claimed in claim 1 wherein:

said at least one photoconductive element includes two photoconductive elements, each photoconductive element having an internal resistance that varies in accordance with the intensity of light impinging on its photo sensitive, said photoconductive elements being mounted in symmetrical positions about the optical axis of said optical system;

said pulse generator means includes first and second oscillators connected to said first and second photoconductive elements, respectively, such that said first and second photoconductive elements control the frequency of pulses generated by said first and second oscillators, respectively; and, said counting means includes first and second counters, one connected to each of said first and second oscillators so as to count pulses generated by said first and second oscillators, said first and second counters being connected to said comparing means such that said comparing means compares the pulse counts counted by said first and second counters.

4. The focusing apparatus claimed in claim 3 including a control system for controlling the application of pulses generated by said first and second oscillators to said first and second counters.

5. The focusing apparatus claimed in claim 4 wherein said control means comprises:

a timer;

a first control AND gate having one input connected to the output of said timer and a second input connected to the output of said first oscillator, the output of said first control AND gate being connected to the input of said first counter; and, a second control AND gate having one input connected to the output of said timer and a second input connected to the output of said second oscillator, the output of said second control AND gate being connected to the input of said second counter.

6. The focusing apparatus claimed in claim 5 wherein said first and second counters are multi-stage counters formed such that they have related stages and wherein said comparing means includes a plurality of compare AND gates at least one of which is connected to corresponding outputs of related stages of said first and second counters.

7. The focusing apparatus claimed in claim 6 wherein said control means includes an output AND gate having inputs connected to the outputs of said plurality of compare AND gates.

8. The focusing apparatus claimed in claim 7 wherein said control means also includes a starting circuit connected to said timer and to one input of said output AND gate.

9. The focusing apparatus claimed in claim 8 wherein said output means also includes a display connected to the output of said output AND gate.

10. The focusing apparatus as claimed in claim 9 wherein said timer is a monostable multivibrator.

11. The focusing apparatus as claimed in claim 1 wherein said counting means includes:

a first counter connected to the output of said pulse generating means for counting the pulses generated by said pulse generating means during sequential predetermined time periods;

a second counter connected to the output of said pulse generating means for counting the pulses generated by said pulse generator means over said sequential predetermined time periods simultaneously with the counting of said same pulses by said first counter;

a third counter; and, a transfer circuit for transferring the pulse count counted by said second counter after the end of one of said sequential predetermined time periods to said third counter, said first and third counters being connected to said comparing means.

12. The focusing apparatus as claimed in claim 11 including a first oscillator for generating additional pulses and applying said additional pulses to said first and third counters subsequent to each of said sequential predetermined time periods.

13. The focusing apparatus claimed in claim 12 including a sequential control means connected to said pulse generator means, said first oscillator and said transfer circuit for controlling the operation of said pulse generator, said oscillator and said transfer circuit in a sequential manner such that subsequent to each of said sequential predetermined time periods, said first oscillator applies pulses to said first and third counters prior to said transfer circuit transferring a pulse count from said second counter to said third counter.

14. The focusing apparatus claimed in claim 13 wherein the output of said comparing means is connected to the reset inputs of said first and third counters.

15. The focusing apparatus claimed in claim 14 wherein said control means includes:

a selector for generating four sequential control outputs, one of said control outputs being connected to said pulse generating means and a second of said control outputs being connected to said first oscillator;

a second oscillator connected to receive the third of said control outputs and connected to said transfer circuit for applying an enabling pulse to said transfer circuit; and, a third oscillator connected to receive the fourth of said control outputs and connected to the reset input of said second counter.

16. The focusing apparatus claimed in claim 15 wherein said output means includes a display.

17. The focusing apparatus claimed in claim 15 wherein said output means includes a drive mechanism connected to move said imaging lens adapted to image light onto the photo sensitive surface of said at least one photoconductive element.

18. The focusing apparatus claimed in claim 1 wherein said counting means comprises:

a first counter connected to receive the pulse output of said pulse generating means during said predetermined time period;

a second counter connected to receive the pulse output of said pulse generator means simultaneously with the receipt of pulses by said first counter during said predetermined time period;

a first shift register;

a first transfer circuit for transferring the output of said first counter to said first shift register;

a second shift register;

a second transfer circuit for transferring the output of said second counter to said second shift register, said shift registers being connected to said comparing means.

19. The focusing apparatus claimed in claim 18 including a shifting means connected to said shift registers for shifting the counts stored in said shift registers through said first and second shift registers.

20. The focusing appartus claimed in claim 19 including a control means for controlling the operation of said pulse generating means, said first and second transfer circuits and said shifting means such that subsequent to said pulse generating means generating pulses over said predetermined time period, the output of said first counter is transferred by said first transfer circuit to said shift register: the counts contained in said first and second shift registers are shifted therethrough, and, then, the output of said second counter is transferred by said second transfer circuit to said second shit register.

21. The focusing apparatus claimed in claim 20 wherein said comparing means is connected to the reset inputs of said first counter and said first and second shift registers so as to reset said first counter and said first and second shift registers prior to the output of said second counter being transferred by said second transfer circuit to said second shift register.

22. The focusing apparatus claimed in claim 21 wherein said control means includes:

a selector adapted to generate five control outputs in sequence, the first control being applied to said pulse generating means for controlling the operation of said pulse generating means such that it generates pulses over said predetermined time period;

a first oscillator having its input connected to receive the second control of said selector and its output connected to said first transfer circuit;

a second oscillator having its intput connected to receive the third control output of said selector and its output connected to the shift inputs of said first and the second shift registers;

a third oscillator having its input connected to receive the fourth control output of said selector and its output connected to said second transfer circuit; and, a fourth oscillator having its intput connected to receive the fifth control output of said selector and its output connected to the reset input of said second counter.

23. The focusing apparatus claimed in claim 22 wherein said output means includes a display.

24. The focusing apparatus claimed in claim 22 wherein said output means includes a drive mechanism connected to move said imaging lens adapted to image light onto the photo sensitive surface of said at least one photoconductive element.

* * * * *

UNITED STATES PATENT AND TRADEMARK OFFICE
CERTIFICATE OF CORRECTION

PATENT NO. : 4,010,479
DATED : March 1, 1977
INVENTOR(S) : Tsukumo Nobusawa

It is certified that error appears in the above-identified patent and that said Letters Patent are hereby corrected as shown below:

Column 4, line 2, "and" should be --an--
Column 5, line 1, "2aand" should be --2a and--
Column 5, line 56, delete the first occurrence of "11c"
Column 8, line 36, delete "conncted" and insert therefor --connected--
Column 8, line 50, delete "cnnected" and insert therefor --connected--
Column 8, line 55, delete "oppostie" and insert therefor --opposite--
Column 8, line 56, delete "cnnected" and insert therefor --connected--
Column 15, line 28, delete "that" and insert therefor --than--
Column 16, lines 66-67, delete "discriminatio" and insert therefor --discrimination--
Column 16, line 68, add a space between the word "single-stage" and "flipflop"
Column 17, line 11, "($f_0 < f'_1 < f'_2 < ...$)" should be --($f_0 > f'_1 > f'_2 > ...$)--
Column 17, line 18, delete "discriminatio" and insert therefor --discrimination--
Column 18, line 18, delete "large" and insert therefor --larger--
Column 18, line 33, delete "signle-channel" and insert therefor --single-channel--
Column 21, line 41, delete "appartus" and insert therefor --apparatus--
Column 22, line 7, delete "shit" and insert therefor --shift--
Column 22, line 24, after the word "control" insert --output--
Column 22, line 18, after the word "control" insert --output--
Column 22, line 34, delete "intput" and insert therefor --input--

Signed and Sealed this

Twenty-sixth Day of April 1977

[SEAL]

Attest:

RUTH C. MASON
Attesting Officer

C. MARSHALL DANN
Commissioner of Patents and Trademarks